US012062274B2

(12) United States Patent
Sakata et al.

(10) Patent No.: US 12,062,274 B2
(45) Date of Patent: Aug. 13, 2024

(54) ALARM CONTROL DEVICE AND ALARM CONTROL METHOD

(71) Applicant: Nippon Telegraph and Telephone Corporation, Tokyo (JP)

(72) Inventors: Kosuke Sakata, Tokyo (JP); Motomu Nakajima, Tokyo (JP); Kyoko Yamagoe, Tokyo (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 235 days.

(21) Appl. No.: 17/431,260

(22) PCT Filed: Feb. 5, 2020

(86) PCT No.: PCT/JP2020/004210
§ 371 (c)(1),
(2) Date: Aug. 16, 2021

(87) PCT Pub. No.: WO2020/170807
PCT Pub. Date: Aug. 27, 2020

(65) Prior Publication Data
US 2022/0130227 A1    Apr. 28, 2022

(30) Foreign Application Priority Data

Feb. 19, 2019   (JP) ................................ 2019-027197

(51) Int. Cl.
*G08B 25/00* (2006.01)
*G06Q 10/20* (2023.01)
*G08B 29/18* (2006.01)

(52) U.S. Cl.
CPC .......... *G08B 25/001* (2013.01); *G06Q 10/20* (2013.01); *G08B 29/18* (2013.01)

(58) Field of Classification Search
CPC .... G08B 25/001; G08B 29/18; G08B 29/185; G06Q 10/20; G06Q 10/00
See application file for complete search history.

(56) References Cited

U.S. PATENT DOCUMENTS

| 8,260,736 B1* | 9/2012 | Lear .......................... G06N 5/02 706/46 |
| 2019/0025811 A1 | 1/2019 | Nakajima et al. |
| 2020/0096984 A1* | 3/2020 | Kishi ................. G05B 23/0232 |

FOREIGN PATENT DOCUMENTS

| JP | 2005157932 | 6/2005 |
| JP | 2011130000 | 6/2011 |

(Continued)

*Primary Examiner* — Quan Zhen Wang
*Assistant Examiner* — Rajsheed O Black-Childress
(74) *Attorney, Agent, or Firm* — Fish & Richardson P.C.

(57) ABSTRACT

To appropriately exclude alarms not requiring maintenance operator confirmation. An alarm control device 1 includes: an individual filter determination unit 11 which acquires, from a storage unit, a determination condition (an individual filter) for whether or not maintenance operator confirmation corresponding to a device alarm issued from a network element device 2 is necessary; an alarm evaluation unit 12 which acquires information corresponding to a determination criterion of the determination condition from a management database 4 managing the network element device 2, checks the acquired information with the determination condition, and determines whether or not maintenance operator confirmation is necessary; and an alarm notification unit 13 which transmits a device alarm to a maintenance operator terminal 5 when the maintenance operator confirmation is determined to be necessary and does not transmit the device alarm to the maintenance operator terminal 5 when the maintenance operator confirmation is determined to be unnecessary.

4 Claims, 2 Drawing Sheets

(56) References Cited

FOREIGN PATENT DOCUMENTS

| JP | 2013250756 | 12/2013 |
|---|---|---|
| JP | 2019021008 | 2/2019 |

\* cited by examiner

ALARM CONTROL DEVICE AND ALARM CONTROL METHOD

CROSS-REFERENCE TO RELATED APPLICATIONS

This application is a National Stage application under 35 U.S.C. § 371 of International Application No. PCT/JP2020/004210, having an International Filing Date of Feb. 5, 2020, which claims priority to Japanese Application Serial No. 2019-027197, filed on Feb. 19, 2019. The disclosure of the prior application is considered part of the disclosure of this application, and is incorporated in its entirety into this application.

TECHNICAL FIELD

The present disclosure relates to a technique for controlling an alarm.

BACKGROUND ART

It is extremely important to gain the trust of customers in terms of service quality by accurately and promptly determining whether or not maintenance operator confirmation is necessary for a large number of device alarms issued when a network or device failure occurs and taking immediate action against the failure. Here, Patent Literature 1 discloses a method of decreasing the number of device alarms by performing regular expression matching (text matching) with respect to an alarm message in the device alarm (method of applying an alarm filter) when detecting the device alarm.

CITATION LIST

Patent Literature

Patent Literature 1: JP 2011-130000 A

SUMMARY OF THE INVENTION

Technical Problem

However, because whether or not maintenance operator confirmation is necessary differs from case to case such as the frequency of alarm occurrence even in the same device alarm, the alarm filter cannot be applied to every case and an important device alarm may be lost when the application method is incorrect. Further, when a large number of alarms are issued due to the occurrence of failure or the like, there is a high probability that an important alarm will be overlooked due to the pressured operations of the maintenance operator.

The present disclosure has been made in view of the above-described circumstances and an object is to appropriately exclude alarms that do not require maintenance operator confirmation.

Means for Solving the Problem

In order to solve the above-described problems, an alarm control device of the present disclosure includes: an acquisition unit configured to acquire, from a storage unit, a determination condition for whether or not maintenance operator confirmation corresponding to an alarm issued from a device is necessary; a determination unit configured to acquire information corresponding to a determination criterion of the determination condition from a management database related to the device, check the acquired information with the determination condition, and determines whether or not maintenance operator confirmation is necessary; and a communication unit configured to transmit the alarm to a maintenance operator terminal when the maintenance operator confirmation is determined to be necessary and not to transmit the alarm to the maintenance operator terminal when the maintenance operator confirmation is determined to be unnecessary.

In the alarm control device, when the determination unit determines that the maintenance operator confirmation is unnecessary, the determination unit deletes the alarm.

An alarm control method of the present disclosure is a method for controlling an alarm by an alarm control device, the method comprising: acquiring, from a storage unit, a determination condition for whether or not maintenance operator confirmation corresponding to an alarm issued from a device is necessary; acquiring information corresponding to a determination criterion of the determination condition from a management database related to the device, checking the acquired information with the determination condition, and determining whether or not maintenance operator confirmation is necessary; and transmitting the alarm to a maintenance operator terminal when the maintenance operator confirmation is determined to be necessary and not transmitting the alarm to the maintenance operator terminal when the maintenance operator confirmation is determined to be unnecessary.

Effects of the Invention

According to the present disclosure, it is possible to appropriately exclude alarms that do not require maintenance operator confirmation.

DESCRIPTION OF EMBODIMENTS

In the present disclosure, the operations of the maintenance operator are reduced and the failure handling work is speeded up by removing alarms that do not require confirmation from a large number of device alarms issued at the time of a failure of a commercial network facility for the purpose of improving the quality of network services in a telecommunications business.

For example, before the device alarm is notified to the maintenance operator, the determination condition (the individual filter) for whether or not maintenance operator confirmation corresponding to the device alarm is necessary is selected, whether or not maintenance operator confirmation is necessary is determined by using the determination condition based on information such as past failure response implementation details and maintenance operator know-how, and the device alarm is notified or not notified to the maintenance operator and the external system based on the determination result.

Accordingly, because flexible alarm filters can be applied according to individual specific situations and the alarms that do not require maintenance operator confirmation can be accurately and promptly removed, the quality of network services is improved and efficient operation of the maintenance operator is realized. Hereinafter, an embodiment of the present disclosure will be described with reference to the drawings.

System Configuration Example

Figure 1:
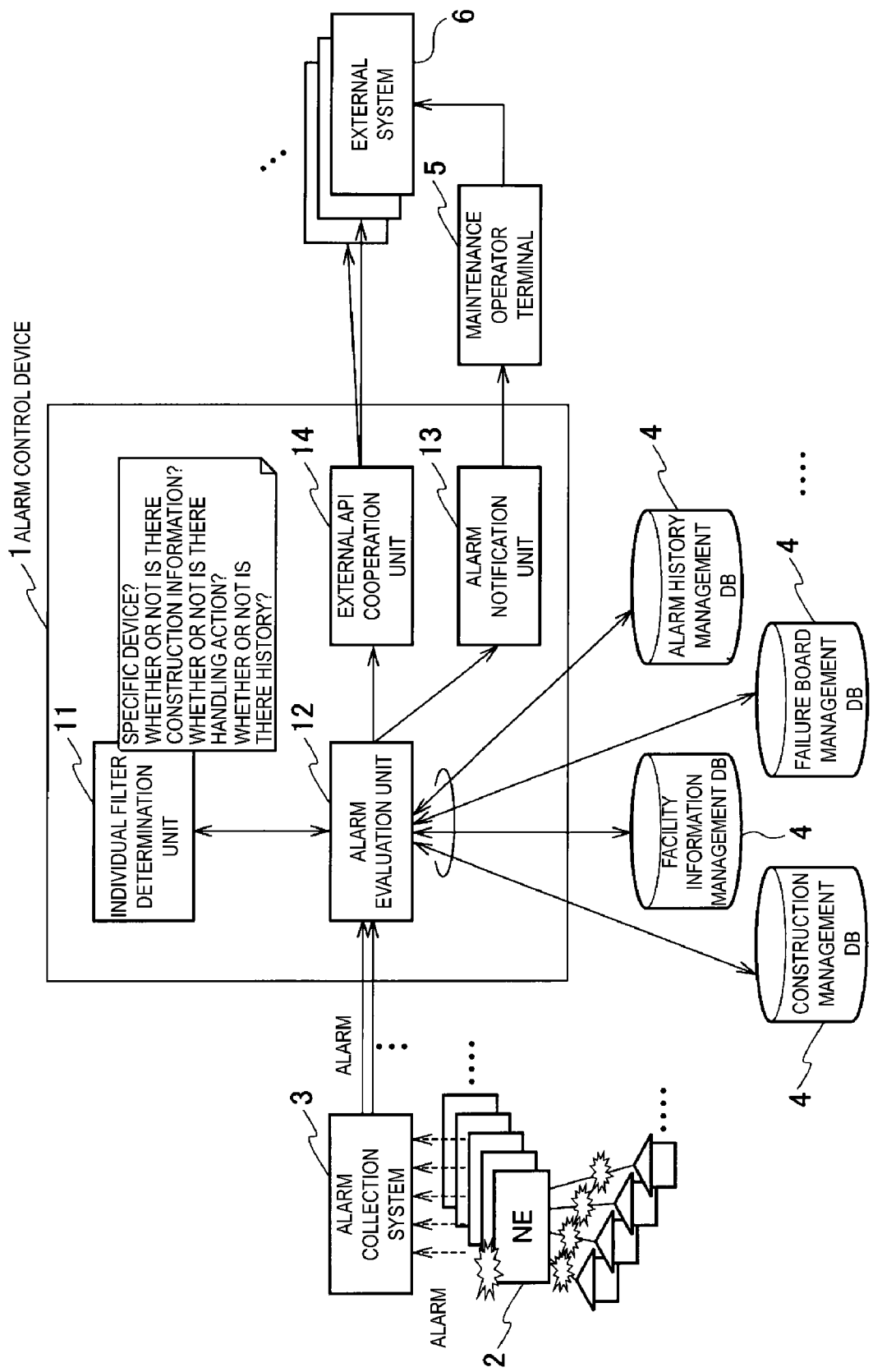
FIG. 1 is a diagram illustrating a configuration example of an alarm control device.

FIG. 1 is a diagram illustrating a configuration example of functional blocks constituting an alarm control device 1. An alarm control device 1 controls the notification/non-notification of the device alarm (alarm information) issued from a network element device 2 in cooperation with an alarm collection system 3 that collects the device alarm.

As illustrated in FIG. 1, the alarm control device 1 mainly includes an individual filter determination unit 11, an alarm evaluation unit 12, an alarm notification unit 13, and an external API cooperation unit 14. Hereinafter, each of these functional units will be described.

The individual filter determination unit (the acquisition unit) 11 has a function of receiving a device alarm issued by the network element device 2 and collected by the alarm collection system 3 through the alarm evaluation unit 12 and acquiring a determination condition (individual filter) for whether or not maintenance operator confirmation corresponding to the device alarm is necessary from a storage unit such as a disk. The determination condition for whether or not maintenance operator confirmation is necessary differs depending on the device alarm and the determination conditions according to the details and type of the device alarm or the like are stored in the storage unit for each of the device alarms while being changed by the maintenance operator.

The alarm evaluation unit (the determination unit) 12 has a function of receiving the condition for determining whether or not maintenance operator confirmation is necessary from the individual filter determination unit 11, acquiring information corresponding to the determination criterion of the determination condition for whether or not maintenance operator confirmation is necessary from the management database 4 managing the network element device 2, checking the acquired information with the determination condition, and determining whether or not maintenance operator confirmation is necessary. The management database 4 is, for example, a construction management DB, a failure board management DB, a facility information management DB, and an alarm history management DB.

In a simple example, a case of a determination condition for a predetermined device alarm is conceived such that the "maintenance operator confirmation is necessary when the total number of the device alarms is two or more, and the maintenance operator confirmation is unnecessary when the total number of the device alarms is less than two". In this case, the alarm evaluation unit (the determination unit) 12 acquires the same or same type of device alarm as the device alarm having occurred in the past from the alarm history management DB 4 as the determination criterion of the determination condition, calculates the number of occurrences of the device alarm, and determines that the maintenance operator confirmation is necessary when the calculated number of occurrences of the device alarm is two or more or determines that the maintenance operator confirmation is unnecessary when the calculated number of occurrences of the device alarm is less than two.

Further, the alarm evaluation unit (the determination unit) 12 has a function of removing (deleting) the device alarm received from the alarm collection system 3 when the maintenance operator confirmation is determined to be unnecessary, and not removing the device alarm when the maintenance operator confirmation is determined to be necessary.

The alarm notification unit (the communication unit) 13 has a function of transmitting the device alarm received from the alarm collection system 3 to the maintenance operator terminal 5 of the maintenance operator when the alarm evaluation unit 12 determines that the maintenance operator confirmation is necessary and not transmitting the device alarm to the maintenance operator terminal 5 when the alarm evaluation unit determines that the maintenance operator confirmation is unnecessary.

The external API cooperation unit 14 is a functional unit which communicates with the external system 6 using an Application Programming Interface (API). When the alarm evaluation unit 12 determines that the maintenance operator confirmation is necessary for the device alarm received from the alarm collection system 3, the external API cooperation unit 14 has a function of transmitting the device alarm to the external system 6. When the alarm evaluation unit 12 determines that the maintenance operator confirmation is unnecessary, the external API cooperation unit 14 has a function of not transmitting the device alarm to the external system 4. In addition, the external system 6 is a device that autonomously analyzes the device alarm, analyzes a coping method for the device alarm using a database inside and outside the system, and outputs the analyzed coping method or the like to a monitor or the like.

Figure 2:
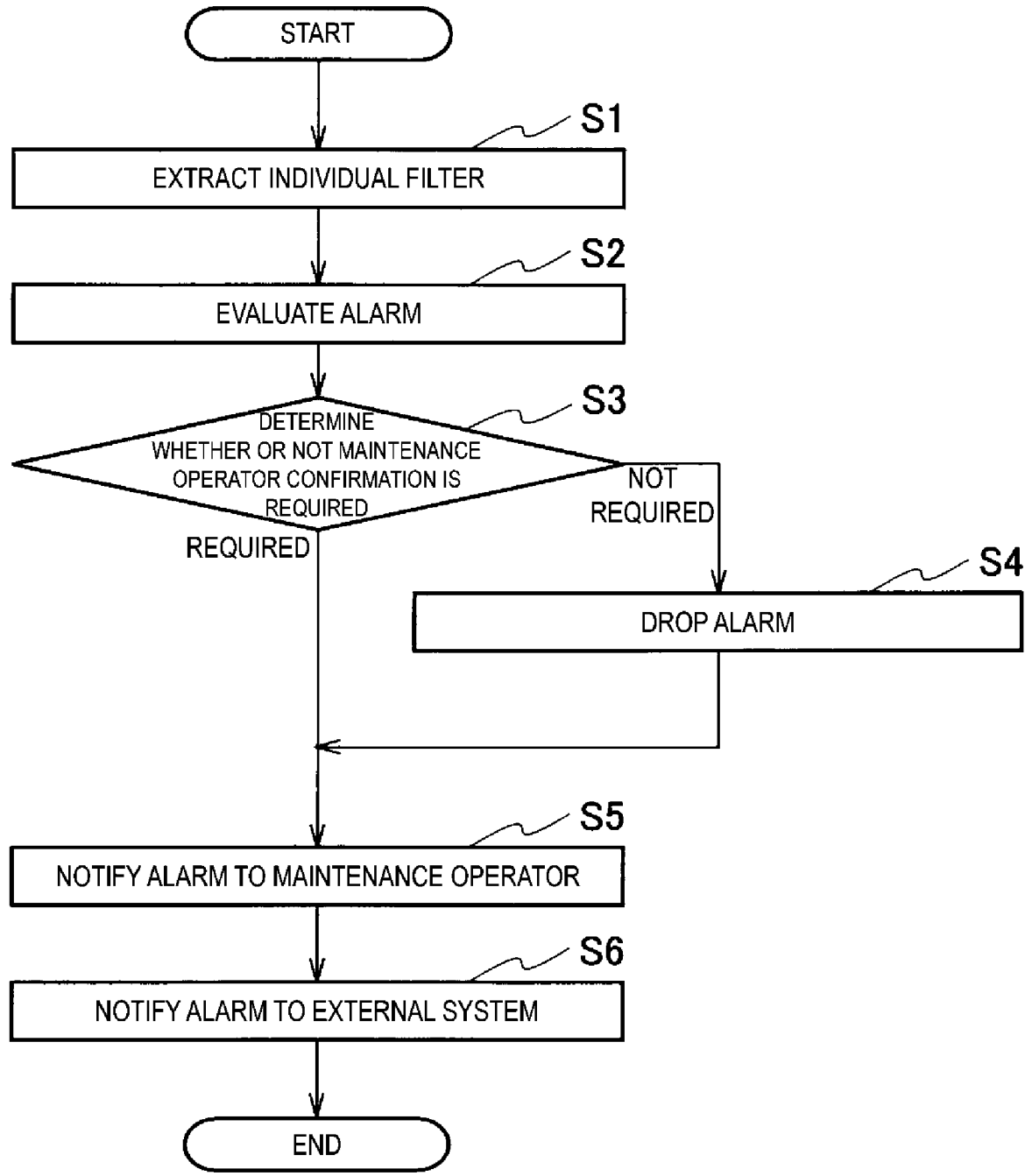
FIG. 2 is a diagram illustrating an operation of the alarm control device.

Next, an operation of an alarm control method which is performed by the alarm control device 1 will be described with reference to FIG. 2. FIG. 2 is a diagram illustrating a process example of a process flow of the alarm control method.

Step S1;

First, the alarm evaluation unit 12 receives a plurality of device alarms collected by the alarm collection system 3 and passes them to the individual filter determination unit 11. The individual filter determination unit 11 outputs the determination condition (the individual filter) for determining whether or not maintenance operator confirmation is necessary based on the information or the like included in the plurality of device alarms from the storage unit.

For example, the individual filter determination unit 11 acquires the individual filter required to determine whether or not maintenance operator confirmation for each of the device alarms is necessary from the storage unit (including the database) inside the alarm control device 1 or on the internet based on the information or the like of the plurality of device alarms passed from the alarm collection system 3. The determination conditions set for the individual filter include, for example, (1) regular expressions used in the individual filters, (2) whether or not the device alarm is planned (notification alarm), (3) whether or not confirmation for the device alarm is necessary is determined (presence of countermeasures), (4) history of the device alarm (whether the same alarm occurs m times or more within the past n hours, wherein n and m are natural numbers), and the like.

Step S2;

Next, the alarm evaluation unit 12 acquires, from the individual filter determination unit 11, the determination condition for whether or not the plurality of maintenance operator confirmations respectively corresponding to the plurality of device alarms is necessary, and evaluates the plurality of device alarms based on the plurality of determination conditions. At this time, the alarm evaluation unit 12 acquires the information necessary for evaluating the device alarm from the management database 4.

For example, when the determination condition for whether or not maintenance operator confirmation corresponding to a predetermined device alarm is necessary is "there is no device construction plan for the device alarm", the alarm evaluation unit 12 inquires to the construction management DB 4 of the management system that manages the construction plans whether the construction for issuing the device alarm was being performed on the date and time when the device alarm was issued. Then, when the construction was not being performed as a result of inquiring whether the construction was being performed, it is evaluated that the determination condition is matched. That is, because the device alarm is issued even though the construction was not performed, the maintenance operator confirmation is determined to be necessary. On the other hand, when the construction was performed, it is evaluated that the determination condition is not matched. That is, because it is clear that the reason for the occurrence of the device alarm is concerned with the construction and no confirmation is required, the maintenance operator confirmation is determined to be unnecessary.

In addition, for example, when the determination condition for whether or not maintenance operator confirmation corresponding to a predetermined device alarm is necessary is "whether the same device alarm occurs twice or more within the past 24 hours", the alarm evaluation unit 12 confirms whether there are two or more alarms that match the regular expression of the individual filter in the network element device 2 that issued the device alarm in the past 24 hours from the alarm history management DB 13. Then, when there are two or more alarms, it is evaluated that the determination condition is matched.

Step S3;

Next, for each of the plurality of device alarms, the alarm evaluation unit 12 determines that the device alarm requires the maintenance operator confirmation when all the determination conditions for whether or not maintenance operator confirmation is necessary are matched and determines that the device alarm does not require the maintenance operator confirmation when any of the determination conditions is not matched. In addition, if all of the determination conditions are matched when matching the definition (removal) of the word "filter" in "individual filter", it may be determined that the device alarm does not require the maintenance operator confirmation. Such adjustment can be handled by appropriately changing the setting contents of the determination condition for whether or not maintenance operator confirmation is necessary.

Step S4;

Then, the alarm evaluation unit 12 removes (deletes) the device alarm that is determined to be the device alarm not requiring the maintenance operator confirmation among the plurality of device alarms and passes the device alarm that is determined to be the device alarm requiring the maintenance operator confirmation to the alarm notification unit 13.

Step S5;

Next, the alarm notification unit 13 transmits only the device alarm excluding the device alarm that is determined to be the device alarm not requiring the maintenance operator confirmation (the device alarm requiring the maintenance operator confirmation) among the plurality of device alarms to the maintenance operator terminal 5 of the maintenance operator.

Step S6;

Further, the external API cooperation unit 14 transmits only the device alarm excluding the device alarm that is determined to be the device alarm not requiring the maintenance operator confirmation among the plurality of device alarms to the external system 6. In addition, step S6 may be performed before step S5 or may be performed at the same time as step S5.

According to this embodiment, the alarm control device 1 acquires, from the storage unit, the condition (the individual filter) for determining whether or not maintenance operator confirmation corresponding to the device alarm issued from the network element device 2 is necessary, and acquires information corresponding to the determination criterion of the determination condition from the management database 4 managing the network element device 2. The alarm control device 1 checks the acquired information with the determination condition, determines whether or not maintenance operator confirmation is necessary, transmits the device alarm to the maintenance operator terminal 5 when the maintenance operator confirmation is determined to be necessary, and does not transmits the device alarm to the maintenance operator terminal 5 when the maintenance operator confirmation is determined to be unnecessary. For this reason, a flexible alarm filter according to an individual specific situation can be applied. Thus, the alarm control device 1 can accurately and promptly remove the device alarm that does not require the maintenance operator confirmation, which enables the quality of network services to be improved and the efficient operation of the maintenance operator to be realized.

In addition, the alarm control device 1 described in this embodiment can be realized by a computer including a CPU, a memory, an input/output interface, a communication interface, and the like. Further, a program for operating a computer as such a device and a storage medium for the program can be also created.

REFERENCE SIGNS LIST

1 Alarm control device
11 Individual filter determination unit
12 Alarm evaluation unit
13 Alarm notification unit
14 External API cooperation unit
2 Network element device
3 Alarm collection system
4 Management database
5 Maintenance operator terminal
6 External system

The invention claimed is:

1. An alarm control device comprising:
an acquisition unit, including one or more computers, configured to acquire, from a storage unit, a set of determination conditions for whether or not maintenance operator confirmation is necessary in response to an alarm issued by a network device notifying a failure in a network service, wherein the set of determination conditions include a condition on whether device alarms having the same alarm type have occurred more than a threshold number of times within a predefined time period;
a determination unit, including one or more computers, configured to:
acquire information corresponding to a set of determination criteria of the set of determination conditions from a management database related to the network device, the information comprising a number of occurrences of the device alarms having the same alarm type that have occurred within the predefined time period, check the acquired information corresponding to each of the set of determination criteria with the corresponding determination condition, wherein the checking comprises determining whether the number of occurrences exceeds a threshold number, and determine whether or not maintenance operator confirmation is necessary, wherein the determination comprises determining that the maintenance operator confirmation is necessary when the number of occurrences of the device alarms having the same alarm type that have occurred within the predefined time period exceeds the threshold number; and a communication unit, including one or more computers, configured to transmit the alarm to a maintenance operator terminal when the maintenance operator confirmation is determined to be necessary and not to transmit the alarm to the maintenance operator terminal when the maintenance operator confirmation is determined to be unnecessary.

2. The alarm control device according to claim 1, wherein the determination unit is configured to delete the alarm in response to determining that the maintenance operator confirmation is unnecessary.

3. The alarm control device of claim 1, wherein the set of determination conditions further comprise one or more of: (1) a condition indicated by a textual description, (2) whether or not the alarm has been planned, or (3) whether countermeasures are present.

4. A method for controlling an alarm by an alarm control device, the method comprising:

acquiring, by one or more computers and from a storage unit, a set of determination conditions for whether or not maintenance operator confirmation is necessary in response to an alarm issued by a network device notifying a failure in a network service, wherein the set of determination conditions include a condition on whether device alarms having the same alarm type have occurred more than a threshold number of times within a predefined time period;

acquiring, by the one or more computers, information corresponding to a set of determination criteria of the set of determination conditions from a management database related to the network device, the information comprising a number of occurrences of the device alarms having the same alarm type that have occurred within the predefined time period, checking the acquired information corresponding to each of the set of determination criteria with the corresponding determination condition, wherein the checking comprises determining whether the number of occurrences exceeds a threshold number, and determining whether or not maintenance operator confirmation is necessary, wherein the determination comprises determining that the maintenance operator confirmation is necessary when the number of occurrences of the device alarms having the same alarm type that have occurred within the predefined time period exceeds the threshold number; and transmitting, by the one or more computers, the alarm to a maintenance operator terminal when the maintenance operator confirmation is determined to be necessary and not transmitting the alarm to the maintenance operator terminal when the maintenance operator confirmation is determined to be unnecessary.

* * * * *